W. H. BUNDY.
TIME RECORDER.
APPLICATION FILED MAR. 8, 1911.

1,088,672.

Patented Feb. 24, 1914.
5 SHEETS—SHEET 1.

Fig-1-

W. H. BUNDY.
TIME RECORDER.
APPLICATION FILED MAR. 8, 1911.

1,088,672.

Patented Feb. 24, 1914.
5 SHEETS—SHEET 2.

Fig. 2.

WITNESSES:
Chas H. Young.
J. B. Smith.

INVENTOR
Willard H. Bundy
BY
Parsons Hall Bodell
ATTORNEYS

W. H. BUNDY.
TIME RECORDER.
APPLICATION FILED MAR. 8, 1911.

1,088,672.

Patented Feb. 24, 1914.
5 SHEETS—SHEET 3.

Fig-3-

WITNESSES:

INVENTOR
Willard H. Bundy
BY
ATTORNEYS

W. H. BUNDY.
TIME RECORDER.
APPLICATION FILED MAR. 8, 1911.

1,088,672.

Patented Feb. 24, 1914.
5 SHEETS—SHEET 4.

Fig. 4.

W. H. BUNDY.
TIME RECORDER.
APPLICATION FILED MAR. 8, 1911.

1,088,672.

Patented Feb. 24, 1914.
5 SHEETS—SHEET 5.

WITNESSES:

INVENTOR
Willard H. Bundy
BY
ATTORNEYS

UNITED STATES PATENT OFFICE.

WILLARD H. BUNDY, OF SYRACUSE, NEW YORK, ASSIGNOR TO W. H. BUNDY RECORDING COMPANY, OF SYRACUSE, NEW YORK, A CORPORATION OF NEW YORK.

TIME-RECORDER.

1,088,672.  Specification of Letters Patent.  Patented Feb. 24, 1914.

Application filed March 8, 1911. Serial No. 613,034.

*To all whom it may concern:*

Be it known that I, WILLARD H. BUNDY, of Syracuse, in the county of Onondaga and State of New York, have invented a certain new and useful Time-Recorder, of which the following is a specification.

This invention relates to recording machines and has for its object a time recorder in which the period of time for each recording operation is reduced to a minimum; and the invention consists in the combinations and constructions hereinafter set forth and claimed.

In describing this invention reference is had to the accompanying drawing in which like characters designate corresponding parts in all the views.

This recording machine comprises, generally, a printing couple including a movable element, a motor for actuating said element, means for normally holding the motor from actuation, and manually operated means for controlling the operation of the holding means to release the motor.

I have here illustrated my invention as embodied in that type of time recorder commerically known as a card time recorder, but obviously it may be embodied in any other type of recording machine.

Figure 2:
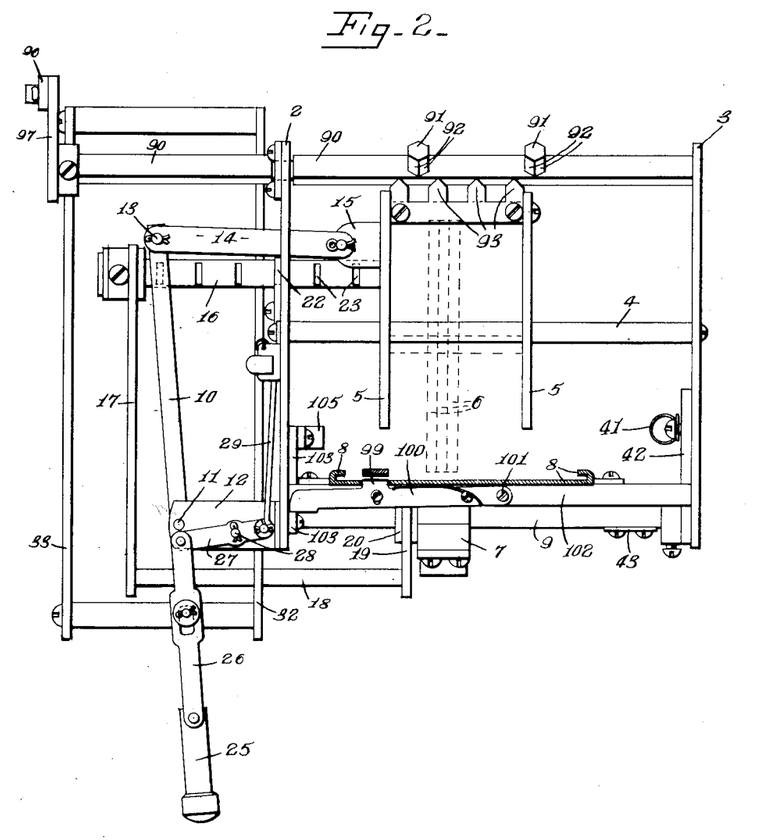
Fig. 2 is an enlarged plan view of parts seen in Fig. 1, parts being omitted.

1 is the main frame of the machine which is supported by a wall or within the lower part of a suitable casing which also incloses the clock mechanism, in the ordinary manner, such frame including side plates 2, 3 connected by cross rods 4 which guide a laterally shiftable frame 5, Fig. 2, supporting the type wheels 6 which constitute the fixed element of the printing couple. The printing couple also includes a movable element as a hammer 7.

The type wheels are connected in any well known manner to the clock mechanism not shown, and the frame 5 and hammer 7 are shiftable laterally relatively to the card guide or receiver 8 which is arranged to support the card between the type wheels 6 and the hammer 7. Such lateral shifting is effected by sliding the frame 5 and type wheels 6 along the rods 4 and sliding the hammer 7 along a rock shaft 9 upon which it is mounted, the rock shaft 9 being journaled at its ends in the side plates 2, 3 of the main frame 1.

Figure 1:
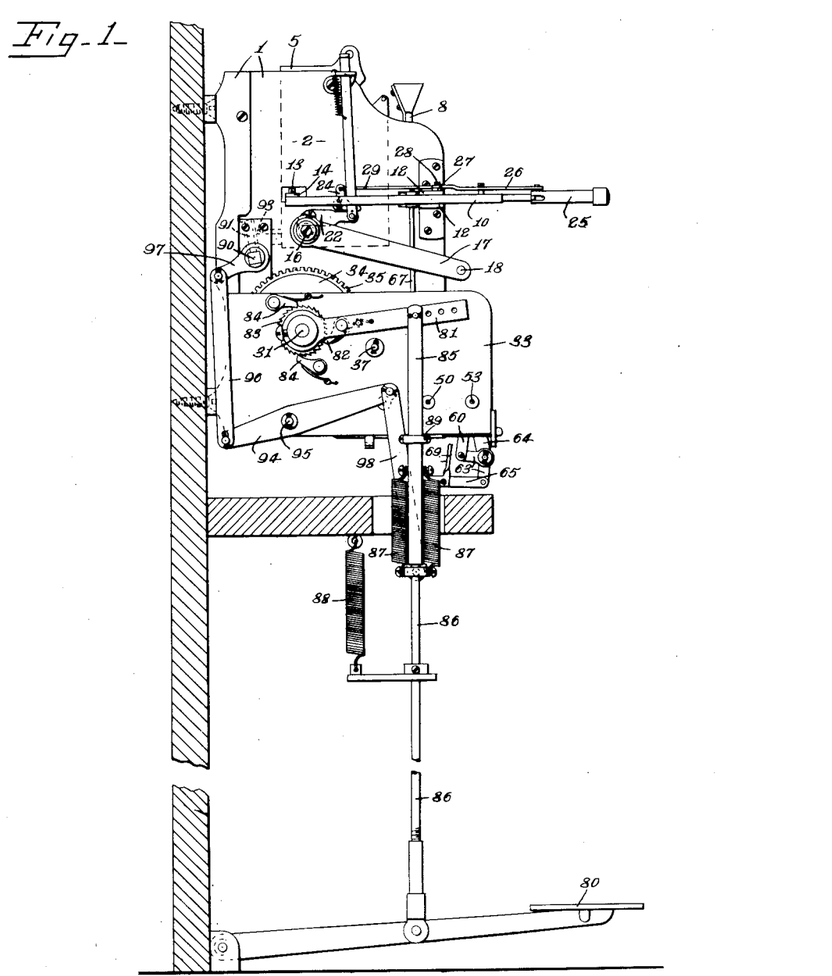
Figure 1 is a side elevation, partly in section and partly broken away, of my time recorder, the time movement and the casing for the recorder being omitted.
Figure 4:
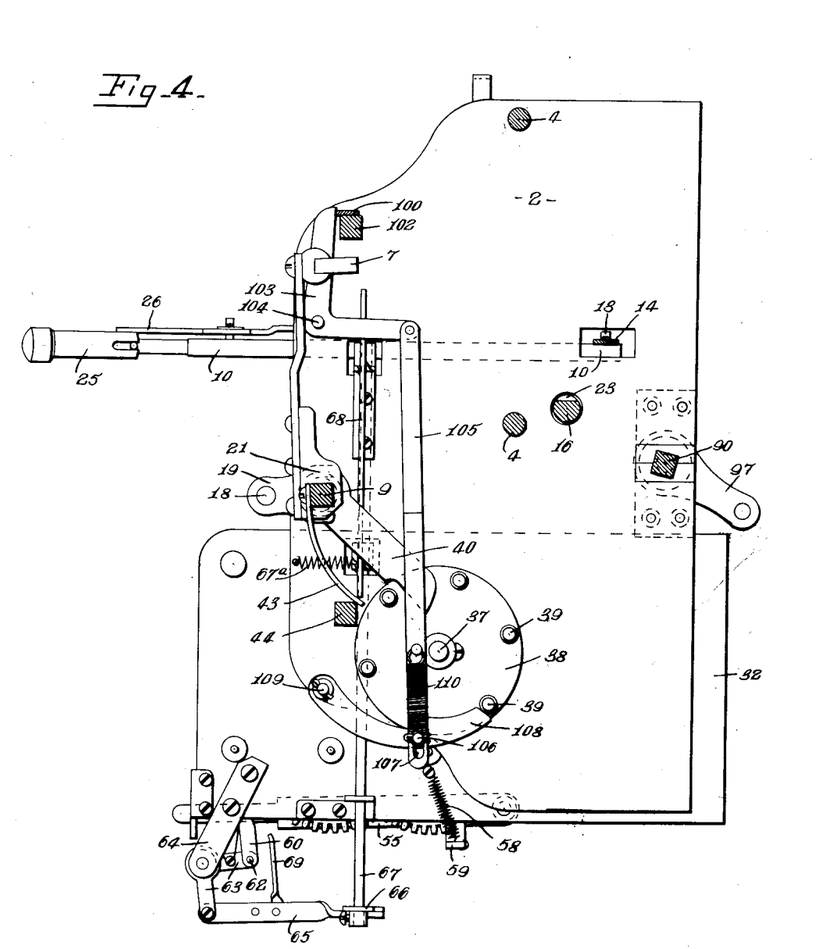
Fig. 4 is an enlarged vertical sectional view through the frame of the time recorder showing in elevation, parts carried on the opposite side of the frame plate shown in Fig. 1, and also showing a portion of the escapement mechanism in opposite side elevation to that seen in Fig. 3.

The sliding of the frame 5 and hammer 7 is effected by means of a lever 10, Figs. 1, 2 and 4, arranged outside of the side plate 2 and pivoted between its ends at 11 to lugs 12 projecting laterally from the side plate 2, the lever 10 being pivoted at 13 at its rear end to one end of a link 14 which is pivoted at its other end to a lug 15 provided on the frame 5. The motion imparted to the frame 5 from the lever 10 is transmitted to the hammer 7 by means of a rod 16 projecting laterally from the type wheel frame 5 through the plate 2 of the main frame, an arm 17 carried near the outer end of the rod 16 and projecting forwardly therefrom, and a rod 18 fixed to the front end of the arm 17 and extending parallel to the rod 16. The rod 18 carries a fork 19 at its free end which engages a grooved collar 20 provided on the bearing 21 of the hammer 7, such bearing 21 sliding along the rock shaft 9. The lateral shifting of the frame 5 and hammer 7 by the lever 10, positions the elements of the printing couple relatively to the card in the receiver 8, so that successive "in" and "out" registrations will be arranged side by side.

The shiftable elements 5, 7 are locked in any position they may be shifted to, by means of a pawl 22, Fig. 1, pivoted between its ends and having one end thereof movable into notches 23 in the rod 16, Fig. 2. The pawl is operated by a bell crank lever 24, Fig. 1, pivoted to the side plate 2 of the main frame 1, and a hand operated piece or sleeve 25, Fig. 2, slidable on the outer end of the lever 10 and connected to one arm of the bell crank lever 24, the other arm of which coacts with the tail of the pawl 22.

The sleeve 25 is connected to the lever 24 by a link 26 slidable on said lever 10 and pivoted to one arm of a lever 27 pivoted between its ends at 28 to the lug 12, the other arm of the lever 27 being connected by a link 29 to the bell crank lever 24. Thus when the hand piece or sleeve 25 is pushed inwardly, the motion thereof will be translated to the pawl 22 to move the pawl 22 out of one of the notches 23 before the lever 10 can be shifted in either direction on its pivot 11 to shift the elements 6 and 7 of the printing couple.

Figure 3:
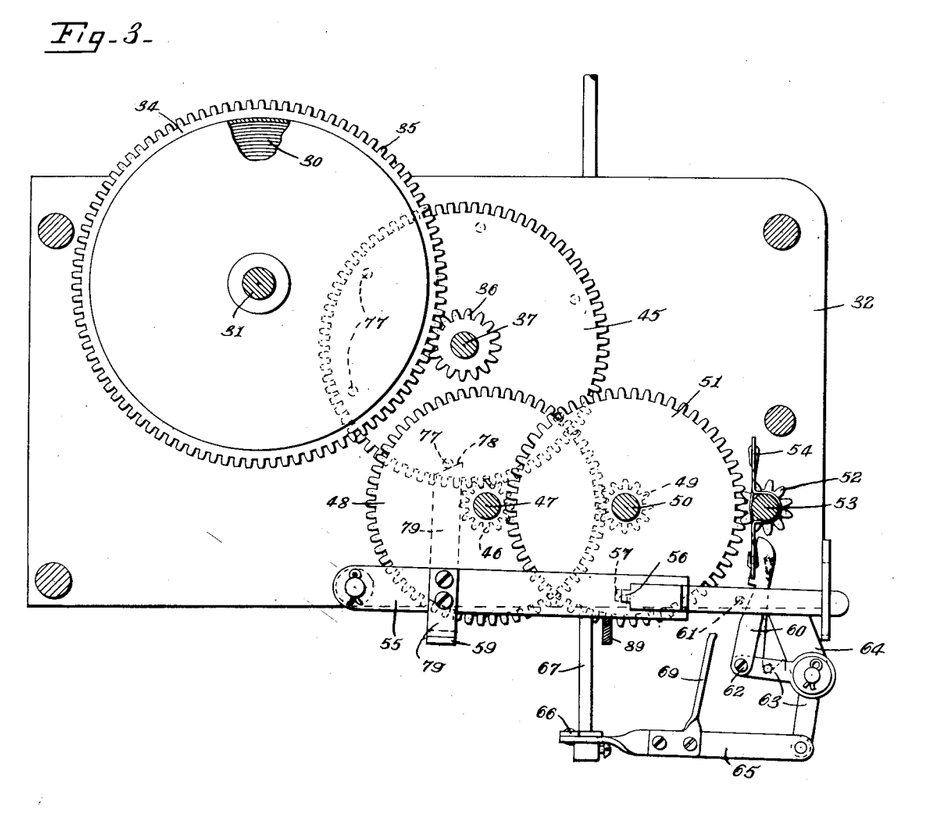
Fig. 3 is an enlarged sectional view through the supplemental frame supporting the motor mechanism and associated parts.

The motor, Fig. 3, for actuating the hammer 7 comprises a spring 30 coiled about a shaft 31 supported between side plates 32 and 33 of a supplemental frame supporting the motor mechanism, one end of the spring being connected to the shaft 31 and the other end thereof being connected to a barrel 34 which incloses the spring and which is provided with a toothed ring or gear 35. The motion of the spring is transmitted to the hammer 7 by means of the barrel 34, gear 35, intermeshing with a pinion 36 mounted on a shaft 37 supported between the plates 32 and 33 and projecting through the side plate 2 of the main frame, and a cam wheel 38 mounted on the end of the shaft 37 projecting through the side plate 2. The cam wheel 38 is provided with points or pins 39 which engage a rock arm 40, Fig. 4, on the rock shaft 9 carrying the hammer and rock said shaft against the tension of a spring 41, Fig. 2. The spring 41 is connected at one end to the frame plate 3, and at its other end to a rock arm 42 on said shaft 9.

The cam wheel 38 is the driving part for all automatically operated parts not actuated by the clock movement, that is, all mechanisms heretofore operated by the hand lever in hand operated time recorders, as for instance, the ribbon feeding mechanism and centering mechanism for the type wheels. The cam wheel 38 also operates card clamping mechanism to be hereinafter described.

The hammer 7 is caused to rebound to its normal position by means of a flat spring 43 fixed at one end to the shaft 9 and having its other end engaged with a bar 44 connecting the side plates 2, 3 of the main frame, this bar 44 also supporting the lower end of the card guide 8.

The means for normally holding the motor from actuation consists of escapement mechanism which is manually operated to release the motor and is reset by means driven by the motor, after the hammer has been operated to make a single impression. In the illustrated embodiment of my invention, a train of gears is driven by the motor, the ratio of the gearing being such that the speed of the gears at the end of the train is increased, and a detent coacts with one of the faster moving gears and is reset after being released by one of the slower gears. The train of gears includes a gear 45 mounted on the shaft 37 and meshing with a pinion 46 mounted on a shaft 47 held between the supplemental frame plates 32 and 33, a gear 48 on said shaft 47 and meshing with a pinion 49 mounted on the shaft 50 supported between said plates 32, 33, a gear 51 also mounted on the shaft 50 and meshing with a pinion 52 mounted on a shaft 53 supported between such plates and upon which is also mounted a suitable governing device as a fan 54.

Figures 5, 6:
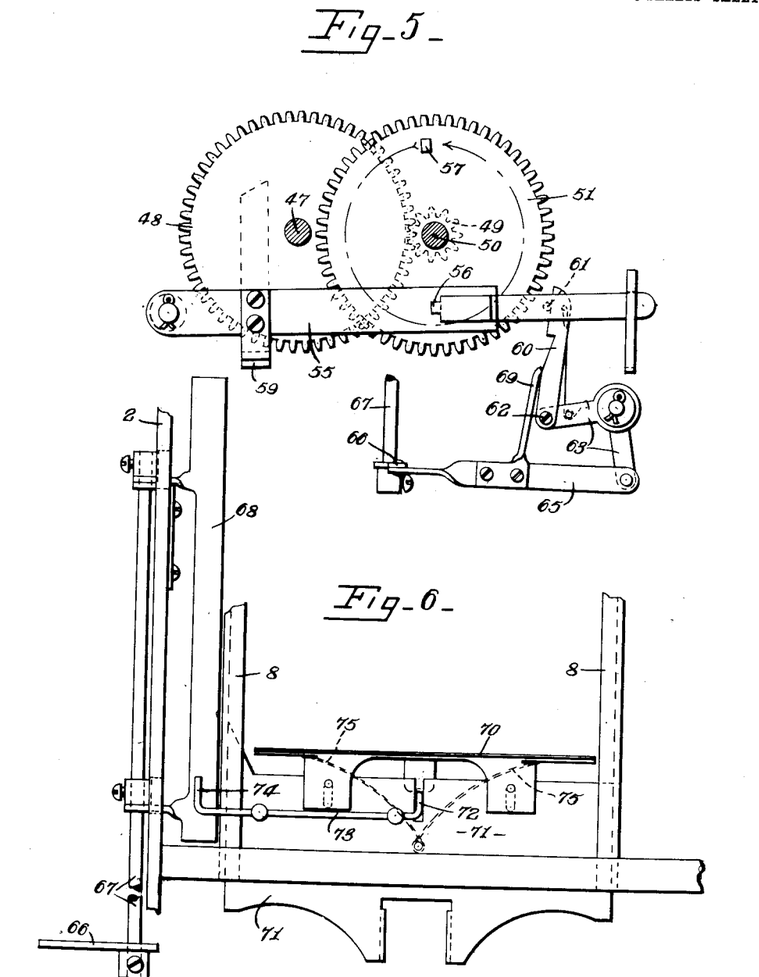
Fig. 5 is an elevation of parts seen in Fig. 3, the detent being shown as out of operative position.
Fig. 6 is a front elevation of the card receiver and contiguous parts.

55 is a detent pivoted to the inner side of the supplemental frame plate 32 and having a shoulder 56 which normally coacts with a shoulder 57 projecting from the side face of the gear 51 and holds the gear 51, and consequently the motor, from actuation. A spring 58, Fig. 4, is connected to a lug 59 projecting from the detent 55, the spring being connected to a fixed point on the plate 2 of the main frame and tending to move the detent 55 upwardly on its pivot to release the gear 51. The detent 55 is operated to move its shoulder 56 out of engagement with the shoulder 57 of the gear 51 by a latch 60, Figs. 4 and 5, said latch having a shoulder movable into engagement with a pin 61 on the detent 55 for pulling the detent 55 downwardly and thereby moving the shoulder 56 downwardly out of the path of the shoulder 57. The latch 60 is shown as pivoted at 62 to one arm of a bell crank lever 63 which is pivoted at its angle to a lug 64, the other arm of the bell crank lever being connected to one end of a link 65. The other end of said link is connected to a rock arm 66 mounted on a vertically extending rock shaft 67, Figs. 3 and 4. The rock shaft 67 extends upwardly along the side of the card receiver 8 and a wide rocking lever or wing 68 is mounted thereon. The rock shaft is actuated by the wing 68 as hereinafter described to move the latch 60 downwardly. A knock-off device 69 is carried by the link 65. Said knock-off device engages the catch 60 after the detent 55 has been operated, and permits the detent to be returned upwardly by its spring 58 into the position shown in Fig. 5.

In the illustrated embodiment of my invention the manually operated means and associated parts comprises a card abutment 70 movably mounted on a carriage 71 slidable in the card guide 8, said abutment 70 coöperating with a rock arm 72 on a rock shaft 73 supported by the carriage 71, and having a rock arm 74 which coacts with the wing 68 and rocks the rock shaft 67 against the action of a returning spring 67ª connected to the wing 68, Fig. 4.

The carriage for the abutment 70 is adjustable to different depths in the card guide, as will be understood by those skilled in the art, in order to position the card relatively to the printing line so that the registrations for the days of the week will be in different horizontal spaces. For instance, Monday morning the carriage is at the bottom of the card receiver in order that the Monday registrations will be at the top of the card and Tuesday morning and succeeding mornings the carriage 71 is shifted a single step, in order that the registrations for the days of the week will be in a vertical column. This adjustment of the card abutment is well known and further description thereof is thought to be unnecessary. During the vertical adjustment of the carriage 71, the rock arm 74 engages different points on the wing 68.

The abutment 70 is here shown as held in its elevated position by a spring 75 having arms engaging the ends of the abutment, and such abutment has a bearing at its center only, and such bearing is on the rock arm 72 so that tilting of either end of the abutment will not depress the rock arm 72. Consequently, the abutment must be moved rectilinearly in order to operate the rock shaft 73.

The detent 55 is normally held from being moved upwardly by its spring 58 by means of one of a number of pins 77 on the gear wheel 45 which makes only a partial revolution during each operation of the hammer 7, such pin engaging the inclined upper end 78 of an arm 79 rigid with the detent, Fig. 3. After the detent 55 has been pulled downwardly by the latch 60 and the train of gears has rotated until the shoulder 57 engaged with the shoulder 56 has cleared such shoulder, the knock-off device 69 releases the latch 60 from the pin 61 on the detent 55, and the detent 55 is pulled by its spring 58 into the position shown in Fig. 5, so that its shoulder 56 is within the circle described by the shoulder 57 of the gear 51. The detent remains in this position until the next shoulder 77 of the gear 45 engages the cam face 78 and depresses the detent 55 until the shoulder 56 is arranged in the path of the shoulder 57.

My time recorder is also provided with means for tensioning the spring motor 30 during each operation thereof, such means comprising an operating member as a treadle 80 connected to a lever 81, Fig. 1, mounted on the end of the shaft 31 and having a pawl 82 coacting with a ratchet wheel 83 fixed on such shaft. Obviously as the lever 81 is oscillated its pawl 82 will take into the teeth of the ratchet wheel 83 and turn the shaft 31 to wind the spring 30, retrograde movement of the shaft 31 being prevented by the pawls 84 coacting with the ratchet wheel 83. The treadle 80 is connected to the lever 81 by means consisting of two parts as rods 85 and 86 connected respectively to the lever 81 and treadle 80, the rods having relative endwise movement which is restrained by springs connecting the same. As here illustrated the rod 86 telescopes within the rod 85 and is connected to such rod in order that the rods 85 and 86 may act as a unit by springs 87.

The tension of the springs 87 is sufficient to normally hold the rods 85, 86 from relative movement but should the spring 30 be wound up, then the springs 87 will yield when the treadle 80 is depressed. The treadle 80 is returned to its normal position by a spring 88.

In order to remind the workmen to depress the treadle 80 when he places his card in the card receiver 8, means is provided whereby the operation of the hammer is prevented until the treadle 80 is depressed, such means coacting with the escapement mechanism in order to prevent the operation thereof when the card abutment 70 is depressed, and, as here shown said means comprises an arm 89 projecting laterally from the rod 85 beneath the detent 55 preventing the operation thereof by the latch 60. When the treadle is depressed this arm 89 also moves downwardly so that it no longer holds the detent 55.

My time recorder is also provided with means for centering the printing element frame 5 prior to the operation of the hammer, that is moving the frame into such position that the pawl 22 will be in one of the notches 23 and not in position between two of such notches. As here illustrated the positioning of the frame 5 is accomplished by means of a rock shaft 90, Figs. 1 2 and 4, having a rock arm 91 thereon provided with diverging faces 92 which move between teeth 93 having diverging faces at their points for coacting with the faces 92 of the arm 91. Obviously if one of the spaces between two of the teeth 93 is not exactly alined with the rock arm 91 when such shaft is operated, one of the cam faces 92 will engage one of the inclined faces of one of the teeth 93 and force the carriage 5 laterally in one direction or the other until the pawl 22 enters one of the notches 23. The rock shaft 90 is actuated by the treadle 80 and the motion of the treadle 80 is translated thereto by means of a lever 94, Fig. 1, pivoted between its ends at 95 to the plate 33 of the frame, one end of the lever 94 being connected by a link 96 to a rock arm 97 on said shaft 90 and the other arm of the lever 94 being connected by a link 98 to the rod 86.

The card clamping mechanism previously referred to, comprises a spring pressed member 99, Fig. 2, movable through a slot in the card receiver near the upper end or mouth thereof, said member 99 being operated by the cam 38 to hold the card during each operation of the time recorder in order to prevent withdrawal of the card during the printing operation or to prevent change of position of the card after the escapement mechanism has been released. Said clamping member 99 is here shown as carried by a lever 100, Fig. 2, pivoted at 101 to a transversely extending bar 102 supporting the upper end of the card receiver 8, and said lever 100 is moved on its pivot by means of a bell crank lever 103, Fig. 4, pivoted at 104 between its ends, one arm of the lever bearing against the free end of said lever 101 and the other arm being connected to a reciprocating link 105 which is connected at its opposite end by a lost-motion connection, as a pin and slot 106, 107, to a rocking lever 108 pivoted at 109 to the inner face of the main frame plate 2 and coacting with the pins or points 39 on the cam 38. During the rotation of the cam 38 one of the pins 39 depresses the lever 108 against the action of the spring 110 yieldingly connecting the link 105 and lever 108 and taking up the lost motion of the pin and slot 106, 107, and causes the clamping member 99 to be pressed inwardly against the card in the receiver 8.

In operation, the workman places his card in the card receiver depressing the abutment 70, and operates the treadle 80. The motion of the abutment operates the escapement mechanism permitting the motor to actuate the hammer 7 to make a record upon the card. Thus the workman is obliged to use but one hand in making a record and owing to the fact that the hammer is actuated by the motor, registrations can be made in much shorter time than when the hammer is actuated in the ordinary manner.

What I claim is:

1. In a card time recorder, a printing couple including a movable element, a motor for actuating said element, means for controlling the actuation of said element by the motor including an escapement, and means for controlling the actuation of the escapement, said means being arranged to be operated by a card when being placed in operative position in the machine, substantially as and for the purpose described.

2. In a card time recorder, a printing couple including a movable element, means for actuating said element comprising a motor, means for normally holding the motor from actuation, means for controlling the movement of the holding means out of operative position, said means being operable by the card when being positioned in the machine, and means operated by the motor for resetting the holding means, substantially as and for the purpose specified.

3. In a recording machine, a printing couple including a movable element, means for actuating the movable element comprising a motor, means for normally holding the motor from actuation including a detent, a spring tending to move the detent out of operative position, means for normally preventing movement of the detent by its spring, and manually operating means for controlling the release of the detent, substantially as and for the purpose described.

4. In a recording machine, a printing couple including a movable element, means for actuating the movable element comprising a motor, means for normally holding the motor from actuation including a detent, a spring tending to move the detent out of operative position, manually operated means for controlling the operation of the detent, and means operated by the motor for normally preventing movement of the detent by its spring and controlling the resetting of the detent in operative position, substantially as and for the purpose specified.

5. In a recording machine, a printing couple including a movable element, means for actuating the movable element comprising a motor normally under tension, means for normally holding the motor from actuation including a detent, a latch movable into connection with the detent, and manually operated means for controlling the operation of the latch, substantially as and for the purpose set forth.

6. In a recording machine, a printing couple including a movable element, means for actuating the movable element comprising a motor, means for normally holding the motor from actuation including a detent, a latch movable into connection with the detent, manually operated means for controlling the operation of the latch, and a knock-off device for engaging the latch and disengaging the same from the detent after the detent has been moved out of operative position, substantially as and for the purpose described.

7. In a recording machine, a printing couple including a movable element, means for actuating the movable element comprising a motor, means for normally holding the motor from actuation including a detent, a latch movable into connection with the detent to move the detent out of operative position, a manually operated member, connections between said member and the latch, and a knock-off device carried by said connections and movable into engagement with the latch to detach the same from the detent when the detent has been moved out of operative position, substantially as and for the purpose specified.

8. In a recording machine, a printing couple including a movable element, means for actuating the movable element comprising a motor, a gear driven by the motor, a shoulder provided on the gear, a detent having a shoulder for coacting with the former shoulder, and manually operated means for controlling the operation of the detent, substantially as and for the purpose set forth.

9. In a recording machine, a printing couple including a movable element, means for actuating the movable element comprising a motor, a train of gears driven by the motor, a shoulder provided on one of the gears, a spring-pressed detent having a shoulder for coacting with the former shoulder, a latch for coacting with the detent, manually operated means for operating the latch, and means associated with one of the gears of the train for resetting the detent against the action of the spring, substantially as and for the purpose described.

10. In a recording machine, a printing couple including a movable element, means for actuating the movable element comprising a motor, a train of gears driven by the motor, a shoulder provided on one of the gears, a spring-pressed detent having a shoulder for coacting with the former shoulder, a latch for coacting with the detent, manually operated means for moving the latch and thereby moving the detent in one direction against the action of the spring, a knock-off device for moving the latch out of engagement with the detent thereby permitting the detent to be moved in the opposite direction by its spring and beyond its operative position carrying the shoulder thereof out of the path of the first-mentioned shoulder, and means provided on one of the gears of the train for resetting the detent against the action of its spring, substantially as for the purpose specified.

11. In a recording machine, a printing couple including a movable element, means for actuating the movable element comprising a motor, a train of gears driven by the motor, the ratio of gearing between the gears being such that one gear makes a partial revolution, and another gear makes several revolutions during each operation of said element, a shoulder provided on the last-mentioned gear, a spring-pressed detent having a shoulder for coacting with the former shoulder, a latch for coacting with the detent, manually operated means for operating the latch, and shoulders provided on the first-named gear for resetting the detent against the action of the spring, substantially as and for the purpose set forth.

12. In a recording machine, a printing couple including a movable element, a card guide, a movable card abutment in the guide, means for actuating the movable element comprising a motor, means for normally holding the motor from actuation, and connections between the movable abutment and the holding means for operating such holding means to release the motor, substantially as and for the purpose specified.

13. In a recording machine, a printing couple including a movable element, a card guide, a movable card abutment in the guide, means for actuating the movable element comprising a motor, means for normally holding the motor from actuation, connections between the movable abutment and the holding means for operating such holding means to release the motor, and connections operated by the motor for resetting the holding means, substantially as and for the purpose set forth.

14. In a recording machine, a printing couple including a movable element, a card guide, a movable car abutment in the guide, means for actuating the movable element comprising a motor, means for normally holding the motor from actuation, and connections between the abutment and the holding means whereby the holding means is operated when the abutment is moved by the card, substantially as and for the purpose described.

15. In a recording machine, a printing couple including a movable element, a card guide, a movable card abutment in the guide, means for actuating the movable element comprising a motor, means for normally holding the motor from actuation including a detent, a spring tending to move the detent out of operative position, a latch for coacting with the detent, and connections between the abutment and the latch, substantially as and for the purpose specified.

16. In a recording machine, a printing couple including a movable element, a card guide, a movable card abutment in the guide, means for actuating the movable element comprising a motor, an escapement mechanism for controlling the actuation of the motor, and connections between the movable abutment and the escapement mechanism whereby the operation of the escapement mechanism is controlled by the abutment, substantially as and for the purpose set forth.

17. In a recording machine, a printing couple including a movable element, a card guide, a movable card abutment in the guide, a carriage for such abutment shiftable to different depths in the guide, means for actuating the movable element comprising a motor, means for normally holding the motor from actuation, and connections between the movable abutment and the holding means for operating such holding means to release the motor, substantially as and for the purpose described.

18. In a recording machine, a printing couple including a movable element, a card guide, a movable abutment in the card guide, a carriage for the abutment shiftable along the guide for positioning the abutment at different depths in the guide, means for actuating the movable abutment comprising a motor, an escapement mechanism for controlling the actuation of the motor, and connections between the abutment and the escapement mechanism whereby the operation of the escapement mechanism is controlled by the abutment, substantially as and for the purpose specified.

19. In a recording machine, a printing couple including a movable element, a card guide, a movable abutment in the card guide, means for actuating the movable element comprising a motor, a gear driven by the motor, a detent for coacting with the gear and normally preventing rotation thereof, a latch for coacting with the detent, a rock shaft extending in a direction parallel to the card guide, a lever mounted on the rock shaft, power-transmitting connections between the lever and the abutment including a rock arm coacting with said lever for moving the same and rocking said shaft, and connections between the rock shaft and the latch, substantially as and for the purpose set forth.

20. In a recording machine, a printing couple including a movable element, a card guide, a movable abutment in the card guide, means for actuating the movable element comprising a motor, a gear driven by the motor, a detent for coacting with the gear and normally preventing rotation thereof, a latch for coacting with the detent, a rock shaft extending in a direction parallel to the card guide, a lever mounted on the rock shaft, power-transmitting connections between the lever and the abutment including a rock arm coacting with said lever for moving the same and rocking said shaft, and connections between the rock shaft and the latch, such connections including a lever carrying the latch, a link connecting the last-mentioned lever and the rock shaft, and a knock-off device for engaging the catch, the knock-off device being carried by the link, substantially as and for the purpose described.

21. In a recording machine, a printing couple including a movable element, a card guide, a movable card abutment in the guide, means for actuating the movable element comprising a motor spring, means for normally holding the spring from actuation, connections between the movable abutment and the holding means for operating the holding means to release the spring, and an operating member for winding the spring during each operation of said movable element, substantially as and for the purpose set forth.

22. In a recording machine, a printing couple including a movable element, means for actuating the movable element comprising a motor spring, an escapement mechanism for controlling the actuation of the spring, manually operated means for controlling the operation of the escapement mechanism, and means for winding the spring during each operation of the movable element of the printing couple, substantially as and for the purpose described.

23. In a recording machine, a printing couple including a movable element, a motor spring for actuating said element, means for normally holding the spring from actuation, manually operated means for controlling the operation of the holding means to release the spring, a member operable to tension the spring preliminary to the releasing of the spring, and means operated by said member for preventing the releasing of the holding means by said manually operated means until said member has been operated to tension the spring, substantially as and for the purpose specified.

24. In a recording machine, a printing couple including a movable element, a card guide, a movable card abutment in the card guide, means for actuating the movable element comprising a motor spring, means for normally holding the spring from actuation, connections between the movable abutment and the holding means for operating the holding means to release the spring, an operating member for winding the spring during each operation of said movable element, and means operated by said member for locking the holding means from operation by the abutment until the operating member has been actuated to wind the spring, substantially as and for the purpose set forth.

25. In a recording machine, a printing couple including a movable element, means for actuating the movable element comprising a motor spring, an escapement mechanism for controlling the actuation of the spring, manually operated means for controlling the operation of the escapement mechanism, means for winding the spring during each operation of the movable element of the printing couple, and means operated by the winding means for normally preventing the operation of the escapement mechanism by the manually operated means until said winding means has been actuated, substantially as and for the purpose described.

26. In a recording machine, a printing couple including a movable element, means for actuating the movable element comprising a motor spring, and means for normally holding said element from actuation by the spring including a detent, manually operated means for controlling the movement of the detent out of operative position, an operating member connected to the spring for tensioning the same during each operation of the movable element, and locking means movable with said member and normally arranged to lock the detent in operative position and prevent movement thereof by the manually operated means, until said member has been actuated to wind the spring, substantially as and for the purpose specified.

27. In a recording machine, a printing couple including a movable element, means for actuating the movable element comprising a motor spring, means for normally holding the motor spring from actuation including a detent, a spring tending to move the detent out of operative position, a latch coacting with the detent, manually operated means for controlling the operation of the latch, means operated by the motor spring for controlling the resetting of the detent in operative position, a member for winding the spring during each operation of the movable element, the member having a locking part associated therewith for engaging the detent and preventing the releasing thereof, until said member has been actuated to wind the motor spring, substantially as and for the purpose set forth.

28. In a recording machine, a printing couple including two elements, one being movable toward and from the other to make a record, a spring for actuating the movable element, power-transmitting parts between the spring and the movable element, and means for winding the spring including additional power-transmitting parts yieldingly connected together, substantially as and for the purpose described.

29. In a recording machine, a printing couple including a movable element, a motor spring for actuating said element, means for winding the spring including a power-transmitting link comprising two parts having relative endwise movement and a spring for normally preventing such endwise movement and causing said parts to act as a unit until the motor spring has been wound up, substantially as and for the purpose specified.

30. In a recording machine, a printing couple including a movable element, a motor spring for actuating said element, means for normally holding the spring from actuation, manually operated means for controlling the operation of the holding means to release the spring, and means for winding the spring including a power-transmitting link comprising two parts having relative endwise movement, and a spring for normally preventing relative endwise movement of said parts until the motor spring is wound up, substantially as and for the purpose set forth.

31. In a recording machine, a printing couple including a movable element, means for actuating the movable element, comprising a motor spring, means for normally holding said element from actuation by the spring, including a detent, manually operated means for controlling the movement of the detent out of operative position, means for winding the spring including a movable part having a shoulder arranged to normally prevent movement of the detent out of operative position by the manually operated means, until the winding means has been actuated, substantially as and for the purpose described.

32. In a recording machine, a printing couple including a movable element, means for actuating the movable element comprising a motor spring, means for normally holding said element from actuation by the spring including a detent, manually operated means for controlling the movement of the detent out of operative position, means for winding the spring including an oscillating lever connected to the spring, an operating lever, and a link connecting said levers and having a shoulder arranged to normally prevent movement of the detent out of operative position by the manually operated means until the winding means has been actuated, substantially as and for the purpose specified.

33. In a recording machine, a printing couple including a laterally shiftable element, and also an element movable to effect the printing of a record, means for shifting said laterally shiftable element, means for actuating the movable element to make a record comprising an operating lever, a rock shaft provided with an arm having diverging cam faces, teeth provided on the laterally shiftable element, and opposed to said arm and having diverging faces for coacting with the cam faces of said arm, and connections between the operating means and said rock shaft, substantially as and for the purpose set forth.

34. In a recording machine, a printing couple including a laterally shiftable element, and also an element movable to effect the printing of a record, means for shifting said laterally shiftable element, means for actuating the movable element to make a record comprising a motor spring, means for normally holding the motor spring from actuation, manually operated means for controlling the releasing of the motor spring, a member for winding the spring during each operation of the motor spring, and means operated by the winding member to accurately position the shiftable member in its lateral adjustment, substantially as and for the purpose described.

35. In a recording machine, a printing couple including a laterally shiftable element, and also an element movable to effect the printing of a record, means for shifting said laterally shiftable element, means for actuating the movable element to make a record comprising a motor spring, means for normally holding the motor spring from actuation, manually operated means for controlling the releasing of the motor spring, a member for winding the spring during each operation of said element, a rock shaft provided with an arm having diverging cam faces, teeth provided on the laterally shiftable element and opposed to said arm, and having diverging faces for coacting with the cam faces of said arm, and connections between the operating member and the rock shaft, substantially as and for the purpose specified.

36. In a recording machine, a printing couple including a laterally shiftable element, means for shifting said element including a lever, a pawl for holding said element in any one of its positions assumed during the lateral shifting of said element, and means for operating the pawl including a member mounted on and movable lengthwise of the lever and serving as a handle therefor, and connections between said member and the pawl, substantially as and for the purpose set forth.

37. In a recording machine, a printing couple including a laterally shiftable element, means for shifting said element including a lever, a pawl for holding said element in any of its positions assumed during the lateral shifting of said element, and means for operating the pawl including a sleeve mounted on the lever and forming the handle thereof and connections between said sleeve and the pawl, substantially as and for the purpose described.

38. In a recording machine, a printing couple including a movable element, a card guide, an actuating member for said element, a clamping member for holding the card in the guide, connections between the actuating member and the clamping member and means normally holding the clamping member out of the path of the card, substantially as and for the purpose set forth.

39. In a recording machine, a printing couple including a movable element, a card guide, an actuating member for said element, a clamping member normally out of position and movable into such position for holding the card in the guide, and connections between the actuating member and the clamping member including parts yieldingly connected together, substantially as and for the purpose described.

40. In a recording machine, a printing couple including a movable element, a card guide, an actuating member for said element, a clamping member normally out of position and movable into such position for holding the card in the guide, and connections between the actuating member and the clamping member, such connections including a lost-motion and a spring for moving one of the parts provided with the lost motion to make up such lost motion, substantially as and for the purpose specified.

41. In a recording machine, a printing couple including a movable element, a card guide, means for actuating said element, including a driving member, a clamping member for holding the card in the guide, and power-transmitting means between the driving member and the clamping member including a lever connected to the clamping member, a lever coacting with the driving member, a reciprocating link connecting the levers and being connected to the last-named lever by a pin and a slot, the pin being provided on the last-named lever and the slot being formed in the link, and a spring connected to the pin and to the link, substantially as and for the purpose set forth.

In testimony whereof, I have hereunto signed my name in the presence of two attesting witnesses, at Syracuse, in the county of Onondaga, in the State of New York, this 28th day of Feb., 1911.

WILLARD H. BUNDY.

Witnesses:
S. DAVIS,
L. M. DAVIS.